May 9, 1944.  F. M. WEIR ET AL  2,348,703
PLYWOOD STRUCTURE
Filed April 9, 1942  2 Sheets-Sheet 1

FRANCIS M. WEIR
PAUL M. DOLAN
INVENTORS

BY John P. Wilson
ATTORNEY

May 9, 1944.    F. M. WEIR ET AL    2,348,703
PLYWOOD STRUCTURE
Filed April 9, 1942    2 Sheets-Sheet 2
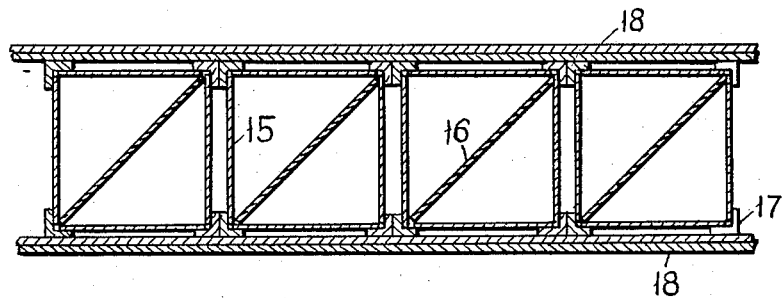
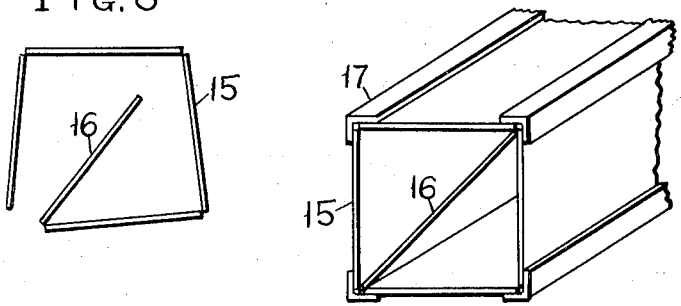
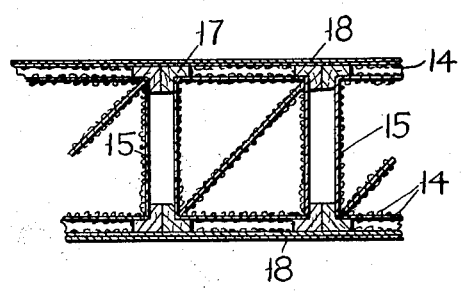
FRANCIS M. WEIR
PAUL M. DOLAN
INVENTORS
BY John P. Nixonow
ATTORNEY Patented May 9, 1944

2,348,703

UNITED STATES PATENT OFFICE 2,348,703

PLYWOOD STRUCTURE

Francis M. Weir and Paul M. Dolan, Essex, Conn.

Application April 9, 1942, Serial No. 438,226

2 Claims. (Cl. 20—91)

Our invention relates to plywood structures and has particular reference to structures formed as a combination of corrugated and flat sheets.

The main object of our invention is to provide a structure which will be relatively thick and resistant to deflection, being at the same time light and inexpensive. We accomplish this purpose by forming a relatively thick plate of thin sheets of plywood, permanently cementing a corrugated or zig-zag shaped sheet of a similar material between the sheets. In order to simplify the manufacture and to obtain a strong junction between the inner zig-zag filler and the outer sheets, we form the filler with the edges so formed that they become parallel when the filler is bent into a zig-zag shape. A convenient method of obtaining this result consists in forming triangular grooves alternately at the opposite sides of the sheet, the angle of the grooves being so selected that the edges of the sheet become parallel at the opposite sides when the sheet is bent into a zig-zag shaped element.

In a modified structure we provide the edges of the zig-zag shaped element with bars or slats having flat sides for cementing them to the outer sheets.

Another object of our invention is to provide means to render the structure sound-proof and to improve its heat insulating properties, for which purpose the structure is provided with a coating of a sound-proofing and heat-insulating material.

While our method is particularly suitable for forming hollow structures of plywood sheets, it is understood, of course, that it can be also used with sheets made of other materials such as cardboard, fiber, veneer, plastic composition, etc.

Our invention is more fully described in the accompanying specification and drawings, in which:

Fig. 7 is a sectional view of a modified structure;

Fig. 8 is a detail view of an inner member in the process of assembling;

Fig. 9 is a perspective view of a unit member; and

Fig. 10 is a detail view of the modified structure coated on the inside.

Figure 1:
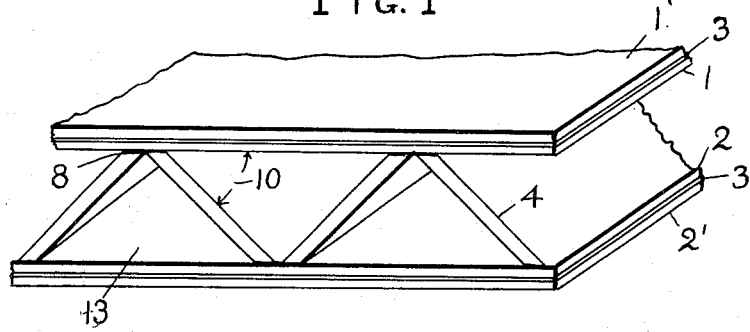
Fig. 1 is a fractional perspective view of my structure.

Our structure as shown in Fig. 1 consists of outer sheets 1 and 2 preferably made of plywood or similar light and strong material. Although metal sheets can be used in our structure, we prefer to use fibrous or plastic non-metallic materials. Good results are obtained when the outer sheets are made of plywood prepared according to the method as disclosed in the United States patent application Serial No. 376,586, filed January 30, 1941, using veneer sheets 1, 1' and 2, 2' with layers of a thermoplastic material 3 therebetween.

Figure 2:
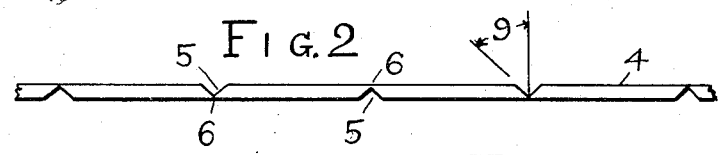
Fig. 2 is an edge view of an inner sheet undercut for bending it into a zig-zag shaped member to form an inner filler of the structure.

The sheets are spaced apart by cementing them to the edges of zig-zag portions 4 of a filler member, or slats, which may be also made of plywood, veneer or similar materials. The filler sheet is prepared, as shown in Fig. 2, by providing it with grooves 5, preferably of a triangular shape, and bending the sheet along the lines 6 opposite the grooves 5. The grooves may be formed by undercutting the material with a suitable tool or by moulding or pressing if the material is suitable for such an operation.

Figure 3:
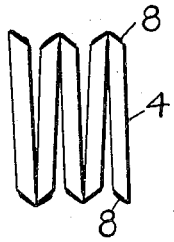
Fig. 3 is a view of the inner filler folded and ready to be cemented at the edges for building the structure.
Figure 4:
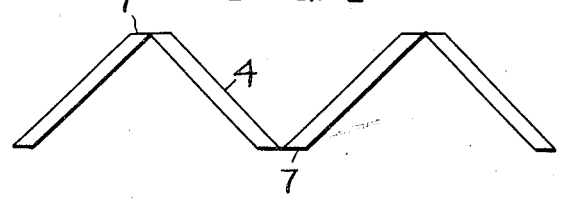
Fig. 4 is a perspective view of the filler member.

The sheet is folded as shown in Fig. 3 for applying cement 8 to its edges, as by dipping them in a container with a liquid cementitious substance, and then again expanded into a final shape as shown in Fig. 4. The sides of the grooves form flat surfaces 7 (Fig. 4) extending in parallel planes when the portions 4 are expanded into a zig-zag shaped or corrugated member.

In order to obtain the flat surfaces 7 for cementing the side sheets 1 and 2, the angle 9 between one side of the slot and the vertical must be approximately equal to the angle 10 between the portions 4 and the sides 1 or 2.

Figure 5:
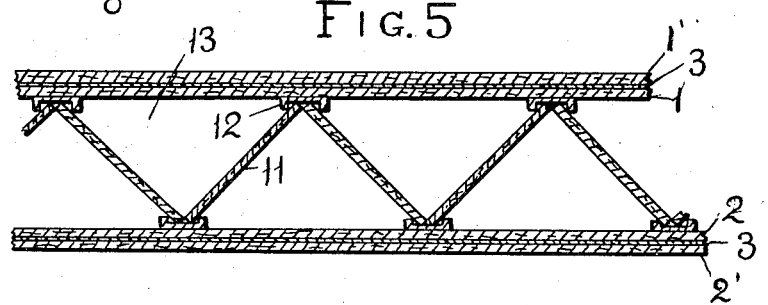
Fig. 5 is a sectional view of a modified structure.

A modified structure is shown in Fig. 5, the edges of the slats 11 being enclosed in channel-shaped bars 12 and secured thereto by a suitable cement 8. The bars 12 help to keep the filler structure in a correct shape before it is cemented to the inner and outer sheeets 1 and 2 and, moreover, the relatively large outer sides of the bars 12 provide a stronger bond with the outer sheets. The added bars 12 are especially useful when relatively thin sheets 11 are used or when the structure is assembled of individual slats.

Our structure can be conveniently used for making walls and partitions in building and other structures where light weight and low cost are important. Our structure has an added advantage in that it has good heat-insulating properties because of its sealed air cells 13. Another advantage of our structure is that it possesses great strength for its weight and tends to retain its shape under heavy transverse and lateral loads.

Our structure is also particularly suitable for making walls of large air ducts for air-conditioning installations, replacing metal ducts. Our ducts in such installations materially conserve fuel by providing a very good heat insulation. They also have an important advantage in that they absorb or suppress the noise produced by fans and other air-conditioning machinery, unlike metal ducts which readily carry these noises to other parts of the building.

Figure 6:
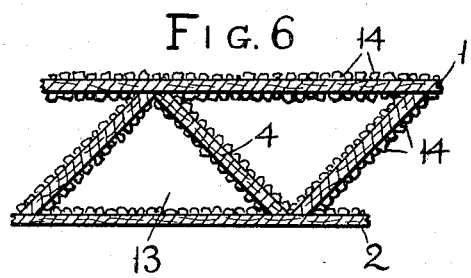
Fig. 6 is a sectional view of a structure treated for rendering it sound-proof.

The noise-suppressing and insulating properties of our structure can be materially increased by providing a coating of a light, fluffy, porous, sound-absorbing material. We have found that good results are obtained by coating the sheets in the structure with crushed asbestos, exploded mica, rock wool and similar materials 14, as shown in Fig. 6. The structure for this purpose is dipped into a solution of a suitable cementitious material such as liquid glass, solution of rosin or similar resinous material in a suitable solvent, etc., and, before the cementitious material becomes dry, dipping the structure into a container with a granular, lumpy or fluffy insulating material 14. The same result can be also obtained by spreading or flowing the insulating material over the cement-coated structure.

A modified structure is shown in Figs. 7 to 10 inclusive. It consists of beams 15 formed by folding a strip of a sheet material, such as veneer, fiber, etc., into a rectangular block with a reinforcing diagonal portion 16 inside, the structure being therefore of a zig-zag shape. The material may be undercut on one side, as shown in Fig. 8, in order to facilitate the bending operation. The beam is reinforced at the corners by angle pieces 17 cemented to the sides of the beam. The assembled member is shown in detail in Fig. 9. A plurality of such beams are placed side by side, the angle pieces 17 being cemented together. Sheets 18, which may be made of plywood or similar material, are then cemented to the angles 17, the complete structure representing a hollow slab of great strength. It can be used for making walls in buildings, refrigerator cars or trucks, airplanes, etc. The structure can be sprayed inside with a suitable cementitious compound, such as sodium silicate, and covered with crushed insulating material 14.

It is understood that my plywood structure may be further modified without departing from the spirit of the invention, as set forth in the appended claims.

We claim as our invention:

1. A method of making a hollow corrugated structure consisting in providing opposite sides of a sheet material with alternate parallel grooves, folding the sheet along the lines opposite the grooves so as to open the grooves into substantially flat portions, and attaching outer sheets to the flat portions so as to obtain triangular prismatic clearances between the folded portions of the inner member and the outer sheets.

2. A hollow corrugated structure comprising a zig-zag shaped inner member formed of a single strip of non-metallic material undercut at alternating sides and bent at the undercut points to form corners, the outer portions of the corners being thereby formed flat, the inner angles between the portions being sharp; and outer sheets attached to the flattened portions of the inner member in parallel relation to each other.

PAUL M. DOLAN.
FRANCIS M. WEIR.